United States Patent [19]

Turner

[11] Patent Number: 4,753,701

[45] Date of Patent: Jun. 28, 1988

[54] METHOD OF MAKING ANTI FOULING MATERIAL

[75] Inventor: Donald M. Turner, Bath, England

[73] Assignee: Avon Rubber p.l.c., Melksham, England

[21] Appl. No.: 843,739

[22] Filed: Mar. 25, 1986

[30] Foreign Application Priority Data

Mar. 26, 1985 [GB] United Kingdom ............... 85 07856

[51] Int. Cl.[4] .......................... B32B 31/00; B32B 3/00

[52] U.S. Cl. .................................... 156/247; 156/276; 156/279; 156/281; 427/205

[58] Field of Search ............... 156/230, 231, 238, 246, 156/289, 298, 276, 279, 62.2; 427/147, 180, 192, 194, 196, 222, 205, 208.2, 146; 428/202, 200, 914, 907; 29/DIG. 31

[56] References Cited

U.S. PATENT DOCUMENTS

Re. 29,072 12/1976 Zondek ............................... 156/289
1,345,922 7/1920 Goldberg ............................ 156/279
4,212,691 7/1980 Potosky et al. ..................... 427/180
4,215,170 7/1980 Vilaprino Oliva .................. 156/234
4,231,830 11/1980 Ryan et al. .......................... 156/233
4,323,599 4/1982 Marshall ............................. 428/907
4,393,099 7/1983 Deregibus ........................... 427/205

FOREIGN PATENT DOCUMENTS 2040232 8/1980 United Kingdom .
1604062 12/1981 United Kingdom .
2126959 4/1984 United Kingdom .

*Primary Examiner*—Donald E. Czaja
*Assistant Examiner*—Louis Falasco
*Attorney, Agent, or Firm*—Kenyon & Kenyon

[57] ABSTRACT

Material having antifouling particles embedded in one surface is made by a transfer process. A sticky backing web is fed through a dip sticky side up. A charge of particles rolls in the dip, being unable to follow the web up a rise unless adhered to its surface in a layer. After coating the layer with a bonding agent a part cured elastomer sheet is brought into contact with the particles which are pressed into its surface, after which the backing web is stripped off to expose the particles.

5 Claims, 2 Drawing Sheets

METHOD OF MAKING ANTI FOULING MATERIAL

FIELD OF THE INVENTION

This invention relates to anti fouling materials and methods of making them.

BACKGROUND OF THE INVENTION

There has been considerable interest recently in anti fouling materials in the form of strips or panels which can be attached to or form part of submersible or semi submersible structures. Examples are in GB-A-Nos. 1604062, 2040232 and 2126959.

SUMMARY OF THE INVENTION

The present invention is concerned with in particular a way of making panels or strips of flexible material and having an anti fouling character due to the presence, in a surface layer of those panels or strips, of anti fouling metal and in particular copper or copper-containing, particles.

The method of the present invention is a transfer process. A flexible web (which may be in discontinuous sheet or continuous strip form) having sticky adhesive surface is drawn along over a conformation which leaves a dip in the web immediately before it is caused to rise steeply. Metal particles are charged onto the web to lie in the dip immediately in front of the rise, at a depth greater than a single layer depth. As the web is drawn up the rise articles which are sufficiently strongly adhered to it are carried with it; excess particles fall back down the rise into the dip and are available there for later adhesion to the travelling web. The adhered particles are then treated by the application of a bonding agent. The initial adhesiveness of the web may be achieved by means which are conventional for self-adhesive tapes; the web may indeed be a heat resistant; and "sticky tape" as is readily available in industry.

Preferred particles are chopped copper or cupro-nickel wire, the thickness of the wire being of the order of 1 mm and a preferred length of the chop being about 1 mm. The density of particles adhered on the surface of the web, which can be controlled by the angle of rise, the rate of progress, the thickness and nature of the adhesive and the size of charge of the particles, should be approximately 4 to 5 or more preferably 4.3 to 4.7 kg per square metre.

After treatment with a bonding agent the web with its particles adhered is placed in contact with an uncured (unvulcanized) or partly cured (part vulcanized) elastomer web (again a discontinuous sheet or panel, or a continuous strip) so that the particles contact the rubber. The two are then moulded together so that the rubber bonds to and around the particles assisted by the bonding agent, but leaving them adhered to the adhesive strip. This is then removed to leave the finished product with exposed particles on one surface.

The invention includes therefore a sheet or strip of flexible material, usually of natural or artificial rubber, into one surface of which is formed by a transfer process a layer comprising discrete particles of anti fouling metal set by a bonding agent on the surface, and which may have the preferred characteristics indicated above.

BRIEF DESCRIPTION OF THE DRAWINGS

In the accompanying drawings.

DESCRIPTION OF THE PREFERRED EMBODIMENT

Figure 1:
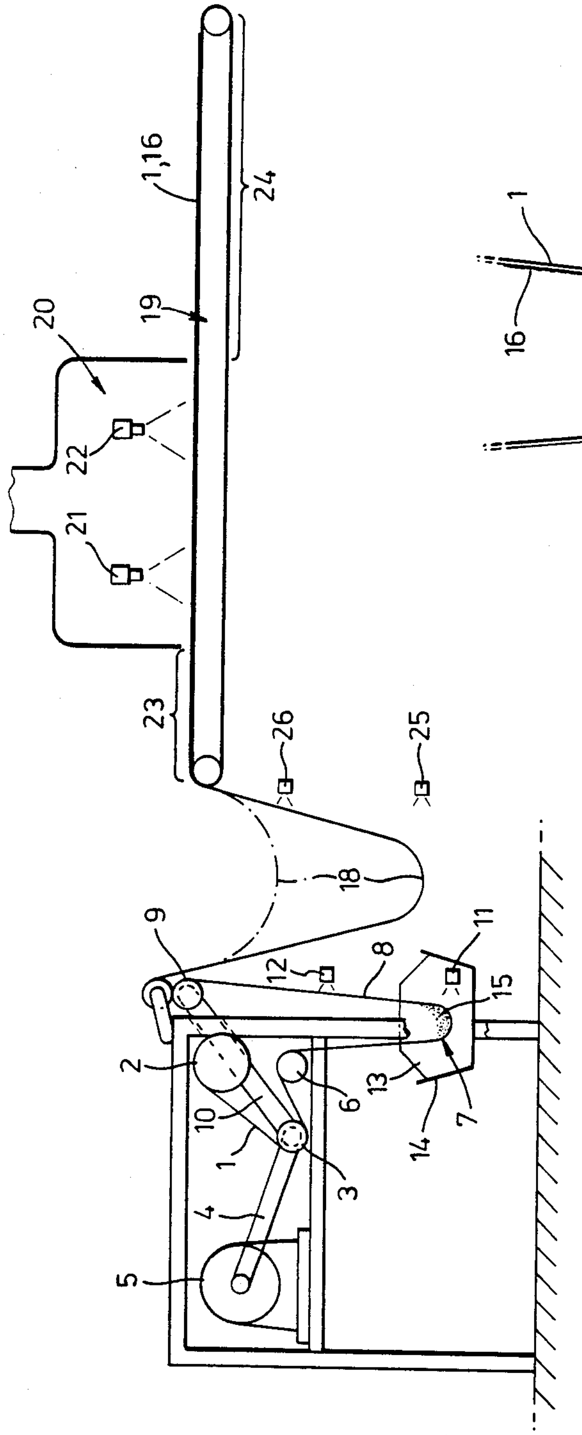
FIG. 1 is a sketch side view of an apparatus.
Figure 2:
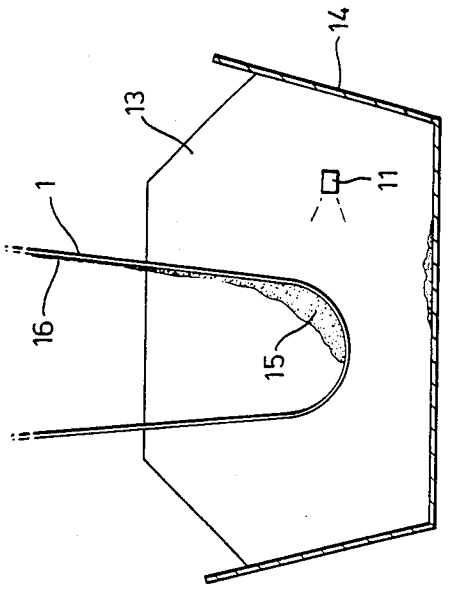
FIG. 2 is a side view of part of it, on a larger scale.

The drawings illustrate apparatus for the application of cupro nickel granules to sticky adhesive tape. The apparatus should be capable of applying granules to adhesive strip or sheet of widths between about 0.3 and 1 m.

A backing web 1 of material with a sticky adhesive surface 1 is pulled off a roll 2 of tape by means of a knurled roller 3 driven through a belt 4 by an electric motor 5. A suitable web is available from ADHESIVE TAPES AND CONVERSIONS LIMITED, Crowborough, Sussex, England under the name PP1 1022. The web passes over an idler roller 6 downwardly into a dip 7 before rising at 8 to a roller 9 which is driven by belt 10 from the motor 5 via belt 4. Photo electric sensors 11, 12 detect if the base of the dip reaches a level below sensor 11 or above sensor 12, and stop the drive if it does. End plates 13 are similar to the guides on a mill roll and can be set to accommodate the width of the web with a minimum or zero gap between the edges of the web and themselves. A trough 14 is below the dip. A bank of granules 15 such as the chopped copper or copper containing wire described above as being preferred, is placed on the adhesive web 1 in the dip 7 and is held on it by the end plates 13. It has been found that, when the strip is pulled through by the roller 9, the weight of the granules is sufficient to preserve the dip 7 and the granules roll, providing excellent coverage of the tape by an adhered layer 16 of granules. Granules which are not adhering to the tape will roll back down the incline 8. The only escape for the granules is that some will fall over the edges and these are caught in the tray 14. These can be led back to the bank 15. Guide surfaces (not shown) may be provided especially behind the rise run 8 to help form the dip and prevent bulging or swinging.

The web with granules on its surface passes between the driven roller 9 and a pressure roller 17 to consolidate the adhered layer 16 and then a variable loop 18 to a main conveyor 19 which indluces a spraying zone 10. There need to be sufficient spraying guns to ensure coverage of the complete width of the strip. The number of spray guns can be activated according to the required width and spray beyond the edges of the web can be blanked off.

The first row 21 of spray guns would be spraying a primer such as Chemlok Primer 205 and the second row 22 an adhesive such as Chemlok Adhesive CH47. Extraction and hot air driers are provided and, if necessary, infra-red heating.

At the moment, anti-fouling material is required in lengths of about 4 m. In this case the total length of the run of the main conveyor 19 should be 1 m. in the region 23 before the spraying zone, 2 m. in the spray zone 20 and 5 m. in the region 24. This will provide room for material to be cut to length and removed sideways from the conveyor 19. This main conveyor 5 (as also the web drives) can be hand driven but preferably will be powered.

It is moved intermittently to allow further actions (to be described) or cutting and removal to occur in the region 24. Since the web 1 is in principle being moved continuously, the loop 18 varies in its extent between the limits shown. Photo electric sensors 25,26 detect these limits and may indeed control the drive of the conveyor 19 in a repetitive run.

Figure 3:
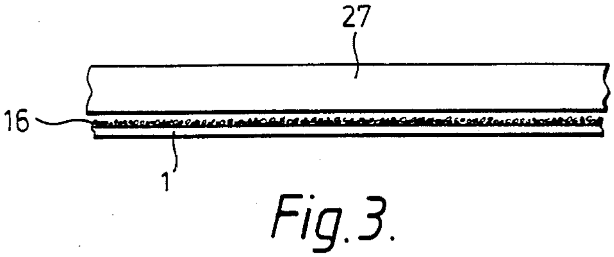
FIGS. 3, 4 and 5 show stages in transfer from a prepared web to an elastomer substrate.
Figure 4:
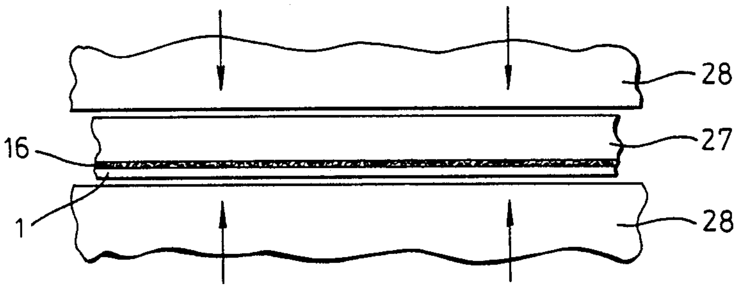

Then, and possibly while the coated strip or sheet lies in the region 24, an uncured or partly cured (unvulcanized or partly vulcanized) elastomer sheet 27 is brought into contact (FIG. 3) with the particles in the layer 16 on the web 1, and the two are moulded together in a press mould 28 (FIG. 4) Pressures of between about 5 and about 10 bar, most preferably about 7 bar are preferred. The particles are pressed into the elastomer surface and are bonded there as it cures or vulcanizes, assisted by the bonding agent coated onto them. They preserve the frequency and distribution of their adhesion on the adhesive strip or sheet. There may also be a fabric backing placed in the press so that the pressing will cause lamination and reinforcement of the elastomer.

Figure 5:
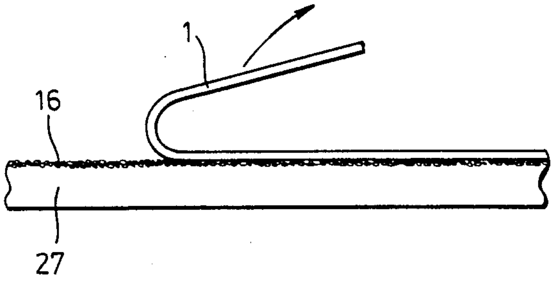

After moulding the backing web 1 is peeled off (FIG. 5), leaving particles 16 uniformly (but with different areas of respective particles) exposed at one surface of the finished article, which may be a strip or panel ready for use or which may be subdivided to form a plurality of them. The one surface may be buffed or polished to ensure presentation of clean metal surfaces.

I claim:

1. A method of making an anti-fouling material comprising the steps of:

causing a backing web having a sticky adhesive face to travel along a path including a dip followed by a rise, the said face being upwards in the dip; and placing a charge of granular particles of anti-fouling material on said face, said charge of particles rolling in said dip against said rise due to said travel, particles of said charge adhering progressively to said face to form a layer of adhered particles;

applying at least a bonding agent to said adhered particles;

applying a surface of a bonding web of elastomer material to said particles;

pressing the webs together to embed and bond said particles in said surface; and stripping off said bonding web to expose at least part of said particles on said surface.

2. The method as claimed in claim 1 including the subsequent step of treating said surface to clean the exposed part of said particles.

3. The method as claimed in claim 1 wherein said particles are particles of a metal of the group consisting of copper and copper alloys.

4. The method as claimed in claim 3 wherein said particles are chopped-wire particles having a thickness and a length of about 1 mm.

5. The method as claimed in claim 1 wherein the density of the adhered layer of particles is between about 4 and about 5 kg/sq meter.

* * * * *